US005418711A

United States Patent [19]

Pomerleau et al.

[11] Patent Number: 5,418,711

[45] Date of Patent: May 23, 1995

[54] OPEN LOOP CONTROL APPARATUS AND ASSOCIATED METHOD FOR CUTTING SHEET MATERIAL

[75] Inventors: Robert Pomerleau, Springfield, Mass.; Zdenek Zeman, Willington, Conn.; Roy McDougall; Joseph Vivirito, both of South Windsor, Conn.

[73] Assignee: Gerber Garment Technology, Inc., Tolland, Conn.

[21] Appl. No.: 124,926

[22] Filed: Sep. 21, 1993

[51] Int. Cl.[6] G05B 13/02; G06F 15/46

[52] U.S. Cl. 364/152; 364/474.16; 364/551.02; 364/470; 395/904

[58] Field of Search 364/152, 476, 447.09, 364/469, 470, 474.03, 150, 153, 551.02, 577, 511, 572, 576, 474.16; 83/74, 174, 747, 756, 925, 49, 71, 56, 208, 174, 482, 373, 110, 117; 82/2 B; 318/571, 39, 564

[56] References Cited

U.S. PATENT DOCUMENTS

| | | | |
|---|---|---|---|
| 3,626,262 | 12/1971 | Kelling | 318/39 |
| 3,698,268 | 10/1972 | Culter | 318/571 |
| 3,765,289 | 10/1973 | Gerber et al. | 83/452 |
| 3,803,960 | 4/1974 | Pearl et al. | 83/56 |
| 3,809,870 | 5/1974 | Auble et al. | 364/572 |
| 3,848,490 | 11/1974 | Arel | 83/49 |
| 3,977,255 | 8/1976 | Groleau et al. | 364/476 |
| 4,133,233 | 1/1979 | Pearl | 83/56 |
| 4,133,235 | 1/1979 | Gerber | 83/74 |
| 4,201,101 | 5/1980 | Gerber | 83/22 |
| 4,327,615 | 5/1982 | Gerber et al. | 83/49 |
| 4,515,545 | 5/1985 | Hinrichs et al. | 364/150 |
| 4,564,911 | 1/1986 | Smith et al. | 364/551.02 |
| 4,666,352 | 5/1987 | Nagao et al. | 364/474.03 |
| 4,734,869 | 3/1988 | Mickowski | 364/476 |
| 4,740,668 | 4/1988 | Perez | 83/373 |
| 4,779,500 | 10/1988 | Bennett et al. | 83/208 |
| 4,841,822 | 6/1989 | Gerber | 83/174 |
| 4,901,359 | 2/1990 | Bruder | 382/8 |
| 5,043,907 | 8/1991 | Richards | 364/474.09 |
| 5,199,341 | 4/1993 | Jones | 83/110 |
| 5,258,918 | 11/1993 | Giancola | 364/476 |

FOREIGN PATENT DOCUMENTS 2242385 10/1991 United Kingdom .

*Primary Examiner*—James P. Trammell
*Attorney, Agent, or Firm*—McCormick, Paulding & Huber

[57] ABSTRACT

An expert system containing a built-in application knowledge is used with a controllable cutting system to automatically seek an optimal feed rate during cutting in response to various of a number of possible changing system cutting parameters wherein a programmable controller defines and specifies a preset configuration file defining the specific cutting system control parameters for directing the operation of the cutting system in accordance with a contour defining a path be followed by a cutter carried by the cutting system and which cutter is moved in an X, Y and C coordinate space across the cutting surface of the cutting system. The X, Y and C axes motors are driven with a commanded current to move the cutter with a velocity defined in the configuration file. The cutting force developed by the cutter is determined at predetermined portions of the contour to determine the toughness of the spread and the actual cutting force is compared to the optimal cutting force with the feed rate being adjusted to increase when the actual force is below the expected force and decrease when the actual force is above the expected force and to shut down the cutting system to rebuilt the contours when the actual force exceeds the expected force by a predetermined magnitude. The feed rate is computed for the contour taking into account information concerning the toughness of the material being cut, the sharpened data, the vacuum level, the knife motor current and the knife velocity.

8 Claims, 3 Drawing Sheets

OPEN LOOP CONTROL APPARATUS AND ASSOCIATED METHOD FOR CUTTING SHEET MATERIAL

CROSS REFERENCE TO RELATED APPLICATIONS

As to subject matter, this application is related to that of an application filed Mar. 30, 1993 and assigned to the same assignee as the present application and entitled CONTOUR BUILDER, Ser. No. 08/040,160 the disclosure of which is incorporated herein by reference.

BACKGROUND OF THE INVENTION

The present invention relates generally to apparatus for cutting sheet material with a closed loop control and deals more particularly with a cutting system and related method using an expert system containing built-in application knowledge with real time monitoring of critical system parameters to control the system's cutting speed during cutting in order adapt the automatic controls to existing conditions and improve and optimize system performance.

It is well known to use automatically controlled cutting machines for cutting limp sheet materials used in garments, upholstery, and other items. Such machines conventionally derive information defining the articles or patterns to be cut from a marker. The marker is a closely arranged array of patterned pieces in positional relationship for cutting from a layup of sheet material. The contours of the pattern pieces which define the cutting paths to be followed by the cutting blade are the rough data which are utilized by the automatically controlled cutting machine in guiding the cutting blade, and such data is translated by the machine into machine commands by appropriate hardware. For example, the marker may be digitized to reduced the contours to point data and when the point data is processed through a computer or data processor to generate machine commands which translate the cutting blade and sheet material relative to one another. The marker data may be preprocessed and recorded for subsequent use in a cutting machine or the data may be processed during the cutting operation.

In most prior art cutting systems which are automated, the cutting operation is substantially fixed by pre-established programs and the marker data. Thus, the maneuvering of the cutting blade along a desired line of cut is controlled in accordance with relatively standard routines that have proven in general to be suitable for many cutting conditions but not necessarily all cutting conditions nor unanticipated conditions and certainly do not represent optimal cutting routines. For example, the standard cutting operation may not be suitable or may produced poor results with certain types of limp sheet material, with layups of substantial depths and even within a single layup displaying different cutting characteristics under different conditions. Improvements over earlier systems have been made which allow a degree of flexibility in the cutting program by allowing the person digitizing the marker to call for special cutting blade maneuvers such as yawing and reduced feed rates under limited circumstances and one such system is disclosed in U.S. Pat. No. 3,803,960.

U.S. Pat. No. 3,848,490 having the same assignee as the present invention discloses a closed loop control system for an automatically controlled cutting machine wherein a pressure sensor (as shown in FIG. 2) is utilized to detect previous cuts in the sheet material in the immediate vicinity of the cutting blade and corrective adjustment in the automatic blade control mechanism is made in response to feedback signals generated by the pressure sensor. The corrective adjustment may reduce the feed rate as the cutting blade passes the previous cut or the blade may be given yaw commands.

U.S. Pat. No. 4,133,235 assigned to same assignee as the present invention discloses an improved closed loop control system for an automatically controlled cutting machine wherein a pressure sensor is utilized to detect previous cuts in the sheet material in the immediate vicinity of the cutting blade and provide corrective adjustment in response to feedback signals generated by the pressure sensor. The corrective adjustments include reducing the feed rate as the cutting blade passes the previous cut or providing yaw commands which rotate the blade slidely out of alignment with the desired cutting path in the region of the cut.

Even with the attendant improvements made with closed loop control systems for automatically controlled cutting machines as described above, the setting of the system feed rate on such machines is a manual operation wherein the cutter operator is responsible for setting the feed rate at the beginning of a cut using a feed rate dial on the cutter's control panel. For the most part, the feed rate setting is a subjective decision made by the operator based on knowledge of the system, fabric composition, ply height and other variable parameters which influence the system performance. In addition, the feed rate setting may also require adjustment during the cutting process to account for changes in the operating conditions. For example, it may be necessary to change the feed rate setting to account for changes in the ply height in step lays or changes in vacuum level on automatic control cutting machines having a vacuum hold down to maintain the sheet material on the cutting surface of the cutting machine wherein the vacuum level drops off due to previous cuts. Generally, the adjustment of the feed rate during the cutting process is handled in one of two ways. The operator can closely monitor the system and change the feed rate at the appropriate time using the feed rate dial. A second alternative is to set the feed rate to accommodate the worst case scenario that the operator anticipates. For example, the operator may set the feed rate for the entire cut at a low enough rate to handle the highest ply in the step lay or to handle the expected vacuum level drops off at the end of a bite. The obvious disadvantage of such an approach is that the overall system throughput is substantially below par. Furthermore, the operator can select only a limited number of discrete, integral feed rates, for example 1–15. For example, an operator may set the feed rate to 8 after concluding that a feed rate of 9 would be too fast. In actuality, the optimal feed rate might be 8.5 or 8.7 and therefore, the potential throughput possible cannot be obtained.

It is believed that more meaningful information concerning the cutting operation can be derived continuously from the interaction of the cutting blade and sheet material and also through monitoring the critical system parameters to automate the feed rate setting and substantially eliminate the requirement of operator intervention. It is, therefore, a general object of the present invention to provide a closed loop method and apparatus for automatically finding the optimal feed rate setting for the "spread" when the cutting process begins and to automatically adjust the cutting speed during the cutting process to account for changing conditions without requiring operator intervention.

It is a further object of the present invention to monitor critical system parameters to set the feed rate at the highest possible level the cutting system can operate at without over exerting the system while reducing wear and tear and the likelihood of encountering cutting problems.

It is a yet further object of the present invention to provide diagnostic capabilities to monitor and enhance cutting system performances by continually updating the amount of information available to the expert system for making decisions in directing the cutting system operation.

SUMMARY OF THE INVENTION

In accordance with the present invention a method and related apparatus is presented wherein an expert system containing built-in application knowledge to automatically seek an optimal feed rate during cutting in response to various of a number of possible changing system cutting parameters is used with a controllable cutting system and includes a programmable controller means for defining and specifying at least one preset configuration file defining specific cutting system control parameter data to direct and control the operation of the cutting system. A processor specifies and defines at least one contour defining a path to be followed by a cutting means and includes motor means for moving the cutting means in an X, y, C coordinate space across the cutting surface. The motor means are excited with a commanded current to move the cutting means with a velocity as defined in the configuration file. The cutting force is determined along a portion of the contour to determine the toughness of the spread. The processor responds to the cutting force to increase the feed rate when the actual force is below the expected force, to decrease the feed rate when the actual force is above the expected force and to shut down the cutting system and rebuild all the contours when the actual force exceeds the expected force by a predetermined amount.

DESCRIPTION OF PREFERRED EMBODIMENTS

Figure 1:
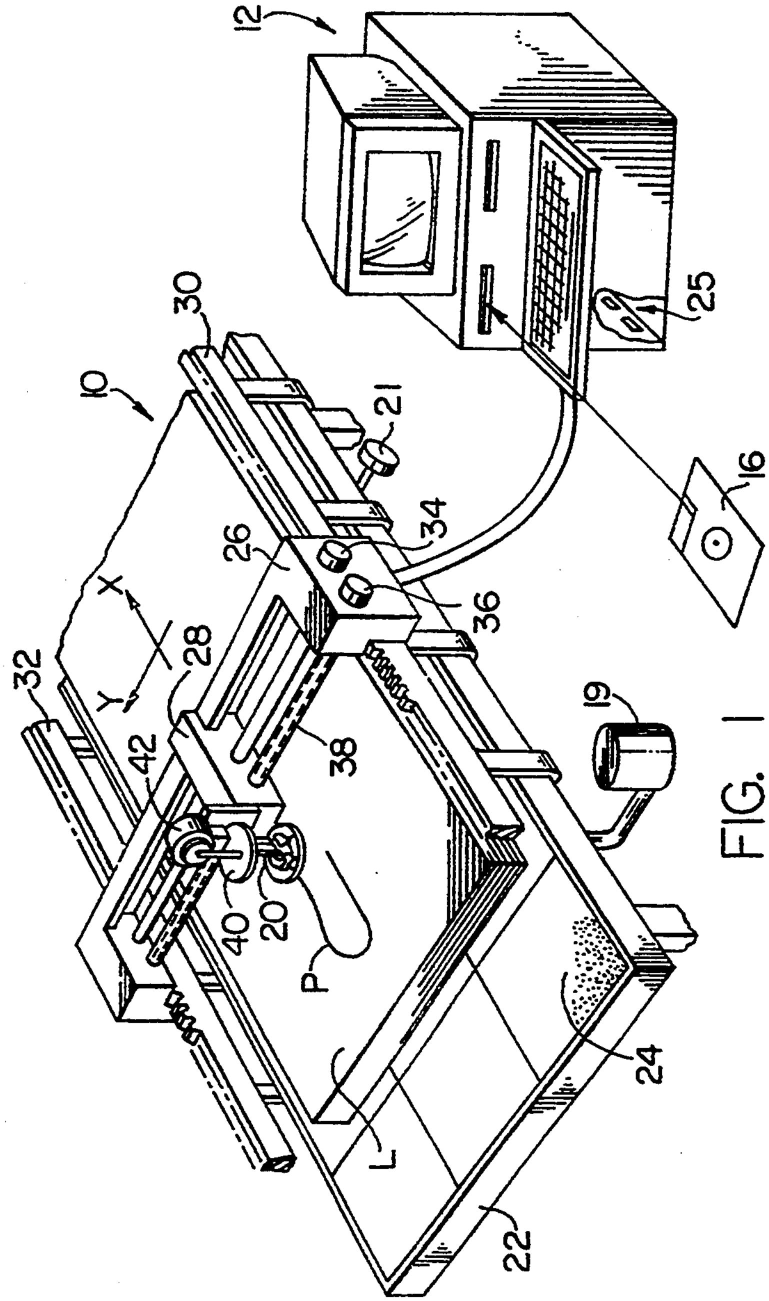
FIG. 1 is a perspective view of an automatically controlled cutting machine embodying the expert system of the present invention..

FIG. 1 illustrates an automatically controlled cutting machine, generally designated 10, of the type in which the present invention may be employed. The cutting machine 10 cuts pattern pieces in a marker from a single or multi-ply layup L of sheet material formed by woven or non-woven fabrics, paper, cardboard, leather, synthetics or other materials. The illustrated machine is a numerically controlled cutting machine having a controller 12 serving the function of a data processor, a reciprocated cutting blade 20, and a cutting table 22 having a penetrable vacuum bed 24 defining a support surface on which the layup is spread, and an operator console 23 for entering information used in the cutting process to control the cutting machine. The controller 12 may be any one of the known types of personal computers capable of reading the digitized pattern data from an external source or from within its memory and which data defines the contours of the pattern pieces to be cut and from an internally stored cutting machine program generates machine control commands. Signals generated at the cutting machine as described in greater detail below are also transmitted from the machine back to the controller 12. While a magnetic diskette 16 has been illustrated as the basic source of cutting data, it will be appreciated that other digital or analog data input devices such as a program tape, may be employed with equal facility.

The penetrable vacuum bed 24 may be one of a number of different permeable beds which are capable of supporting sheet material such as bristles having upper, free ends defining the support surface of the table. The bristles can be penetrated by the reciprocated cutting blade 20 without damage to either the blade or table as a cutting path P is traversed in the layup. The bed employs a vacuum system including the vacuum pump 25 as described and illustrated in greater detail in U.S. Pat. Nos. 3,495,492 and 3,765,289 having the same assignee as the present invention.

Although not shown in FIG. 1, an air impermeable overlay, may be positioned over the multi-ply layup L to reduce the volume of air drawn through the layup. The vacuum system then evacuates air from the bed 24 in order to make the layup more rigid and to compress or compact the layup firmly in position on the table at least in the zone where the cutting tool operates. A pressure sensor 21 is used to monitor the vacuum level supplied to the bed and for providing information concerning the vacuum level variations to the controller 12. The vacuum is sensed at the intake manifold in the case of a non-zoned system and in the zone of cutting in a zoned system.

The controller 12 also includes a motion control system computer shown generally at 25 in FIG. 1 and which motion control system computer 25 includes processors for building or rebuilding contours, determining cutting forces, analyzing feedback parameters related to system operation, directing other processors such as digital signal processors (DSP's) and communicating with X, Y and C axes motors and servo units, respectively. A more detailed description of the motion control system computer 25 and the control method of the expert system of the invention follows below in connection with the explanation of FIGS. 3 and 4.

The reciprocating cutting blade 20 is suspended above the support surface of the table by means of the X-carriage 26 and Y-carriage 28. The X-carriage 26 translates back and forth in the illustrated X-coordinate direction on a set of racks 30 and 32. The racks are engaged by pinions (not shown) rotated by an X-drive motor 34 in response to machine command signals from the motion control system computer 25. The Y-carriage 28 is mounted on the X-carriage 26 for movement relative to the X-carriage in the Y-coordinate direction and is translated by the Y-drive motor 36 and a lead screw 38 connecting the motor with the carriage. Like the drive motor 34, the drive motor 36 is energized by machine command signals from the motion control system computer 25. Coordinated movements of the carriages 26 and 28 are produced by the motion control system computer 25 in response to the digitized data taken from the magnetic diskette 16 to translate the reciprocating cutting blade 20 along a cutting path P.

Figure 2:
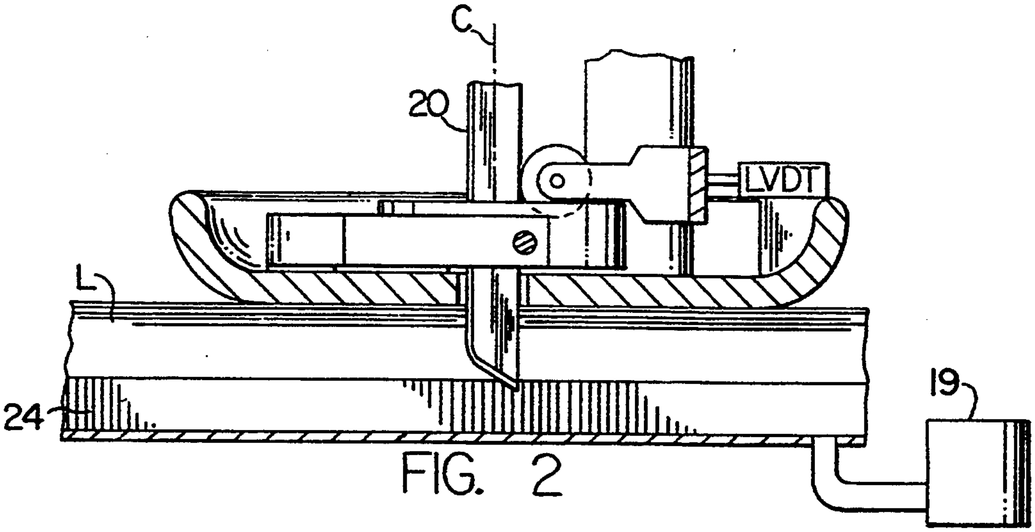
FIG. 2 is a fragmentary side elevation view, but with parts shown in section, of a presser foot around the cutting blade with sensors for monitoring some cutting parameters which are used by the expert system of the invention to control the cutting machine.

The cutting blade 20 is suspended in cantilever fashion from a rotatable platform 40 attached to the projecting end of the Y-carriage 28. The platform and the cutting blade are rotated about a C-axis (FIG. 2) extending longitudinally through the blade perpendicular to the sheet material by means of a C-axis motor 44 (not shown) which is also controlled from the motion control system computer 25. The motor 44 and rotatable platform serve the function of orienting the cutting blade at each point along the cutting path P. The rotatable platform 40 is vertically adjustable and elevates the sharp, leading cutting edge of the blade 20 into and out of cutting engagement with sheet material on the table. An elevation motor (not shown) for moving the platform is also controlled by the controller 12. The cutting blade 20 is also reciprocated by means of a stroking motor 42 supported above the platform 40 and is well known in the art.

Figure 3:
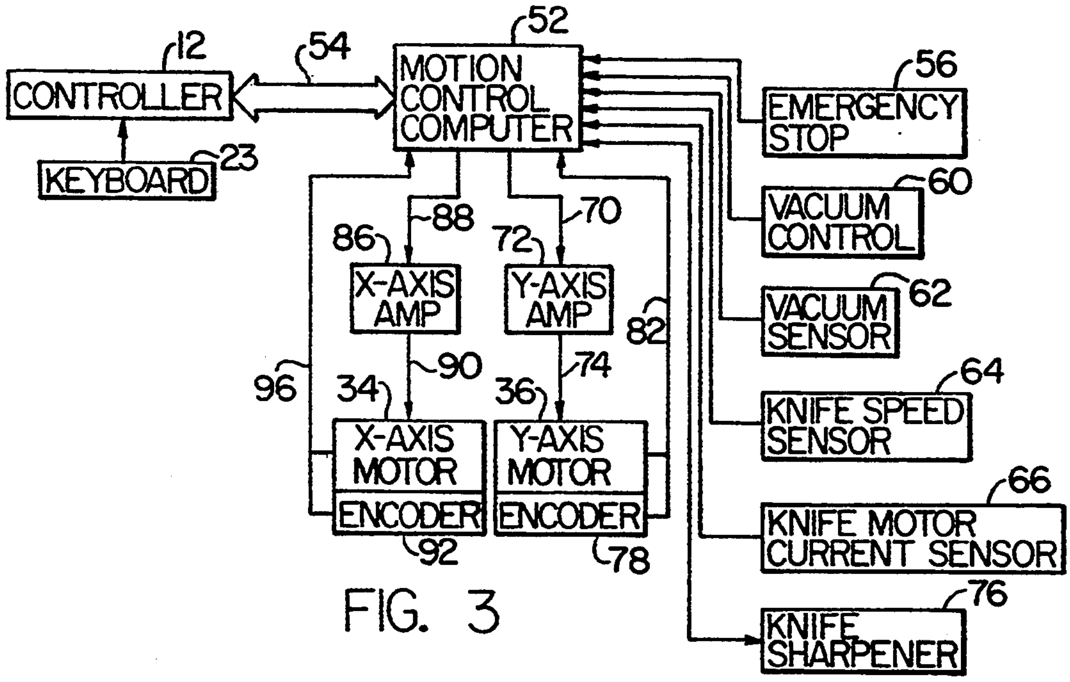
FIG. 3 is a schematic diagram illustrating a closed loop control system for the machine in one embodiment of the invention.

Turning to FIG. 3, a schematic functional block diagram is shown illustrating the basic functional components of one embodiment of the present invention. As illustrated, the controller or computer 12 communicates with processors located on the motion control system computer 52 via a two-way data bus 54 to send and receive information related to the system operation and expected performance. The controller 12 provides, in addition to other information, multiple preset configuration files each of which contain specific information and characteristics of each of the various system parameters which are used to automatically tailor and optimize the cutter performance to a specific fabric composition and ply height. The configuration file defines and specifies the range of feed rates, that is, minimum and maximum cutting speed for a given cutting application. The configuration file data is empirically developed and determined based on actual cutting experience with different materials and ply heights.

The motion control system computer 52 also receives information from the controller 12 by means of a keyboard 23. The keyboard 23 of controller 12 is used to initiate cutter operation, initialize system settings and enter appropriate system information as required to operate the cutting machine. As illustrated, for example, a manual emergency stop command 56 may be initiated via the keyboard 23 or an emergency switch and which stop command is communicated to the motion control system computer 52 which in turn causes the cutting process to come to a halt. The controller 12 may also activate other cutting machine operations and for illustrative purposes, FIG. 3 shows the motion control system computer 52 of the controller 12 coupled to a vacuum control shown in function block 60 which may perform several functions including initiating the start of the vacuum pump, and inputting other information related to the vacuum system and its monitoring and sensing including upper and lower limits of the vacuum level.

The motion control system computer 52 also receives feedback signals related to the vacuum level during the cutting process and which vacuum level is determined by vacuum sensor shown in function block 62. Other system cutting parameters which are used in applying the expert system knowledge to the cutting process include information related to knife speed which is coupled to the motion control system computer 52 by means of the knife speed sensor shown in function block 64. Likewise, an indication of the knife cutting force being generated during the cutting process is derivable from the knife motor current detected by the knife motor current sensor shown in function block 66 and which information is also provided to motion control system computer 52. Further, information concerning the condition of the edge of the knife blade, time from last sharpening and the like is shown in function block 76 and which information is provided to the motion control system computer 52. Other information related to blade performance is also sensed and detected, such as blade deflection using means (see FIG. 2 for example) well known to those skilled in the art and such information is also fed back for use by the expert system.

The motion control system computer 52 also provides the driving current to the Y-axis motor 68 through the lead 70 which in the illustrated embodiment is input to Y-axis amplifier 72 to cause the amplifier to produce the commanded driving current on the lead 74 which is coupled to the X-axis motor 68. Information concerning actual motor performance is indicated by an axis encoder 78, and which encoder is part of the motor, is fed back via the lead 82 to the motion control system computer 52 which computer 52 in turn uses the information to monitor and determine system cutting performance and modify and adjust the system cutting parameters as required based on the built-in application knowledge of the expert system to seek the optimum cutting rate. Likewise, the X-axis motor 84 is also driven by means of a commanded current signal inputted to the X-axis amplifier 86 by means of the input lead 88 to cause the amplifier 86 to produce the desired X-axis motor current on the lead 90 to drive the X-axis motor 84. Information concerning actual motor performance is indicated by means of an axis encoder 92, and which encoder is part of the motor, is fed back via lead 96 to the motion control system computer 52 which computer 52 in turn uses the information to monitor and determine system cutting performance and modify and adjust the system cutting parameters as required based on the built in application knowledge of the expert system to seek the optimum cutting rate. Likewise, the motion control system computer 52 also provides C-axis motor current to the C-axis motor for rotating the cutting platform and which information is also fed back via an encoder to the motion control system computer for use in monitoring and determining system performance and for adjusting the cutting parameters as required based on the built in application knowledge of the expert system to seek the optimum cutting rate.

Figure 4:
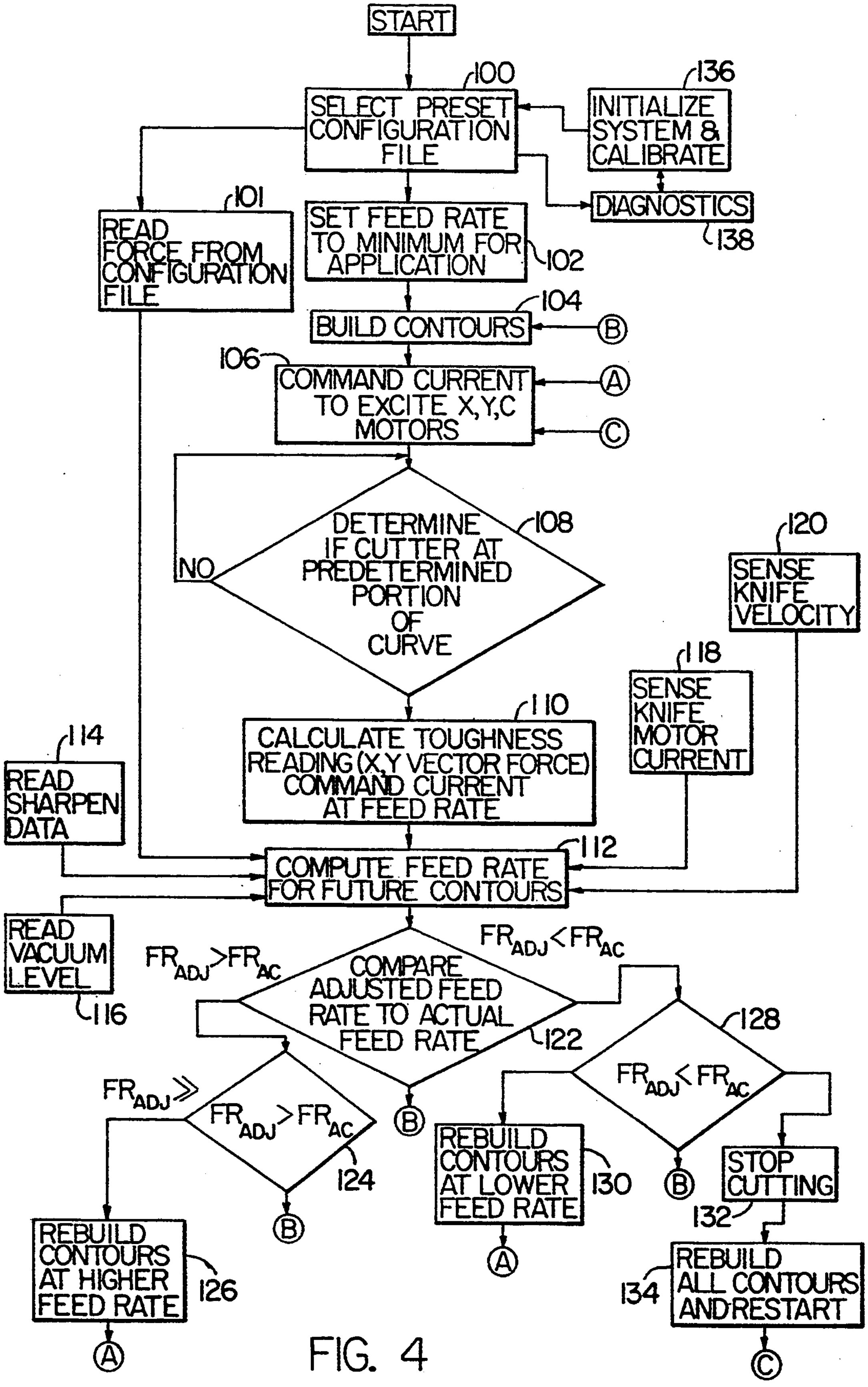
FIG. 4 is a flowchart of one embodiment of the method of the expert system of the present invention.

FIG. 4 illustrates a flowchart for one embodiment of the method of the invention. As illustrated, information required to control the cutting process is entered by means of the controller or other appropriate methods and devices for selecting preset configuration files designed for the material type to be cut. The configuration file contains information concerning the optimal force to be used for the material to be cut and specifies a maximum and minimum feed rate. The optimum force setting is based on previous knowledge and is a measure of the resistance to cutting and is dependent on fabric composition and ply height. When the system is cutting, the toughness of the spread material is monitored and compared to expected values for that application. If the system detects a toughness reading that exceeds the optimum level, the system knows that the cutting is too fast for the particular spread and the cutting speed is adjusted to cut at a slower speed. If the system detects a toughness reading that is lower than the optimum level, the system knows that a higher cutting speed can be tolerated for the given spread and the cutting is then incrementally increased. The system will hunt for the best cutting speed for the spread of fabric being cut based on this information. Since the configuration file data is developed for a specific material, an operator only has to select the type of material to be cut, for example, silk, denim, cotton, etc., via the keyboard 23 to initiate system operation and the appropriate preset configuration file is selected as shown in step 100. Once the material type information is entered the feed rate is set to the minimum rate for the application as shown in step 102, the system reads the configuration file data and minimum feed rate and builds the necessary contours in step 104 by means of a contour builder as disclosed in the above-identified patent application Ser. No. 08/040,160 to which reference may be made for further information relative to the contour builder.

The resulting contour data as determined by the contour builder in step 104 specifies the X-axis motor current and the Y-axis motor current and the Y-axis and X-axis motors are excited in step 106 to cause the desired coordinate movement of the cutter across the cutting surface of the cutting system. The expert system software starts a cut at a lower feed rate (the minimum feed rate for the application) and gradually builds to the optimal feed rate in response to the cutting conditions as indicated by the various cutting system parameters which are fed back for analyzation and use in making the necessary adjustments. The system determines in step 108 whether the cutting is taking place at a flat portion of the contour and if the cutting is at the flat portion of the contour, a fabric "toughness" (vector force) is calculated in step 110 based on the amount of X,Y current being commanded to maintain the feed rate and this information is used in step 112 in computing the feed rate for the contour. Although the present embodiment is disclosed with the fabric "toughness" being calculated at a flat portion of the contour, the "toughness" can be determined at any location along the contour as the cutter accelerates and decelerates. The optimum force or expected force for the application is read in step 101 from the preset configuration file data and is used in step 112 in computing the feed rate for the contour. The calculated force $F_c$ is compared to the expected force $F_e$ in adjusting the feed rate. If the calculated force is less than the expected force an increase in the feed rate is indicated. If the calculated force $F_c$ is greater than the expected force $F_e$ a decrease in the feed rate is indicated. If the calculated force $F_c$ is substantially greater than the expected force $F_e$ a rebuilding of the contours used in future cuttings is indicated.

The method of the present invention also utilizes information relative to the knife cutting edge in determining the feed rate. This information is known and the wear characteristics of a given knife material for a given fabric are determined such that experience knows that the knife may cut a given material a given number of inches with the cutting being more easily accomplished at the time closest to the time that the knife edge is sharpened or honed therefore allowing for a higher feed rate with the feed rate being decreased as the time from sharpening increases to take into account the dulling of the knife edge. One such edge dulling compensation method is disclosed in U.S. Pat. No. 4,133,233 assigned to the same assignee as the present invention. The knife sharpened data is read in step 114 and is used to computing the feed rate for the contour in step 112.

The method of the present invention also utilizes information relative to the vacuum level of the cutting system and this information is read in step 116 and is used in computing the feed rate for the contour in step 112. The cutting behavior for a given material at a given vacuum level is known information and is determined such that experience knows that the knife may cut a given material at a higher feed rate when the vacuum level is higher with the feed rate being reduced when the vacuum level drops off. The computed feed rate for the contour in step 112 will be increased when the vacuum level in step 116 increases.

Still referring to FIG. 4, the system takes into account the knife motor current and actual knife velocity readings in determining the system feed rate. The knife motor current is sensed in step 118 and for illustrative purposes is taken to measure the current of the stroking motor 42 which drives the knife with a reciprocating motion wherein the current is sensed with well known current sensing means. The commanded knife motor current $I_{kc}$ is compared to the actual knife current $I_k$. The information concerning the knife motor current sensed in step 118 is used in computing the feed rate for the contour in step 112. The velocity of the knife, that is, the reciprocating speed of the blade in the illustrated embodiment is sensed in step 120 and such measurements may be made by means of a tachometer or other means well known to those skilled in the art. The knife velocity $K_v$ is compared to the commanded knife velocity $K_{vc}$. The information concerning the knife velocity sensed in step 120 is used in computing the feed rate in step 112. If the expert system detects that the cutting system is having increased difficulty in maintaining the commanded knife reciprocating velocity and which difficulty is indicated by the simultaneous increase in knife motor current and dips in the actual knife velocity, a reduction in feed rate is indicated.

After the feed rate has been computed for future contours in step 112, that is, the adjusted feed rate, this computed feed rate is compared in step 122 to the actual feed rate. If the adjusted feed rate is greater than the actual feed rate the expert system determines in step 124 if the adjusted feed rate and the actual feed rate are within a specified range and if such a determination is made, the system returns to step 104 and continues cutting. If it is determined in step 124 that the adjusted feed rate substantially exceeds the actual feed rate, the expert system rebuilds the contour at a higher feed rate in step 126 and this information is inputted to step 106 to adjust the commanded current specified to excite the X, Y and C motors, respectively.

If the adjusted feed rate is less than the actual feed rate as determined in step 128, the expert system determines if the adjusted feed rate and actual feed rate are within a specified range of one another and if such a determination is made, the system continues the cutting with step 104. If the adjusted feed rate is less than the actual feed rate a lower feed rate is indicated and the contours are rebuilt at a lower feed rate in step 130. The information from the rebuilt contours in step 130 is input to step 106 to adjust the command current exiting the X, Y and C motors, respectively.

If on the other hand the adjusted feed rate is substantially less than the actual feed rate as determined in step 128, the information causes the system to stop cutting in step 132 and causes all the contours to be rebuilt in step 134. The rebuilt contour information is returned to step 106 to restart the system cutting and excite the X, Y and C motors, respectively with the current specified from the data of the rebuilt contours.

The system also includes the ability to self-calibrate and determine axis frictional forces in step 136. The axis frictional force diagnostics are run in the "dry run" mode without operator intervention so that the system determines the "no-load" frictional forces that must be overcome to maintain the axis motion at each of the system's feed rates. This information is stored and retrieved for later usage as a baseline comparison when the system translates the spread toughness readings into cutter speed settings. The diagnostics are also important and are run periodically to recalibrate the system and to detect mechanical wear and tear. For example, the detection that the amount of force required to move an axis at a specific feed rate has changed from one running of the diagnostic to the next running, indicates that something has changed in the system mechanics and this information can be used when performing diagnostics on site or from a remote location via a modem to identify the problem, if any, or to provide compensation for the change. The system calibration diagnostic is carried out in step 138.

Step 138 also includes a critical system parameter monitoring diagnostic which logs and analyzes preselected critical system parameters that are also used in the expert system. The monitoring diagnostic is flexible in that it permits the actual data items to be logged to be selectable and typical choices include the knife current, knife speed, the cutting velocity, the X, Y and C axes motor current, vector force which provides an indication of toughness, vacuum level and other system parameters as necessary. The information is sampled and saved at least several times a second and is available for real time monitoring and analyzation or may be stored for subsequent retrieval for analyzation of system performance. The information gained through the diagnostics is subsequently added to the present information and knowledge used by the expert system in making decisions to adjust and take advantage of a given condition during the cutting process to increase the system performance and quality of the cut product as it seeks the optimal cutting rate.

The invention claimed:

1. In combination with a controllable cutting system, an expert system containing built-in application knowledge to cause the controllable cutting system to automatically seek an optimal feed rate to cut a ply height of various limp sheet material during a cutting operation in response to various of a number of possible system cutting parameters which parameters are changing during the cutting process, said system comprising:

means including motor means for moving a cutting means in an X, Y, C coordinate space across the cutting surface of said controllable cutting system;

programmable controller means for defining and specifying prior to a first cutting operation at least one preset configuration file defining specific cutting system control parameter data for directing the operation of the cutting system in an open loop control mode in accordance with said cutting system control parameter data;

at least one processor means coupled to said programmable controller means and said controllable cutting system for specifying and defining at least one path to be followed by said cutting means carried by said cutting system;

said preset configuration file defining:

a minimum feed rate and a maximum feed rate for cutting a ply height of specific predetermined limp sheet material;

an X-commanded current magnitude and a Y-commanded current magnitude for energizing said motor means to move said cutting means in an X, Y coordinate direction across said cutting surface at a feed rate within said minimum and maximum feed rate defined in said preset configuration file, said X-commanded current and said Y-commanded current defining a motor current contour for operating said motor means at an expected predetermined velocity in said X, Y coordinate direction at each point along said at least one path;

said processor means having means for calculating from said X-commanded current magnitude and from said Y-commanded current magnitude a force expected at each point along said at least one path;

means for exciting said motor means with said X-commanded current magnitude and said Y-commanded current magnitude to move said cutting means with a predetermined feed rate defined in said preset configuration file;

means for identifying the position of said cutting means along said at least one path;

means for determining from the X-commanded current and the Y-commanded current supplied to said motor means a single force vector representative of the actual cutting force developed by said cutting means at said predetermined portion of said at least one path to determine the toughness of the "spread";

means for comparing said actual cutting force to an expected cutting force at said predetermined portion of said path to generate a force difference level magnitude, and said processor means being responsive to said force difference level magnitude to increase the feed rate when the actual force is below the expected force, decrease the feed rate when the actual force is above the expected force and to cause the controllable cutting system to shut down when the actual force exceeds the expected force by a predetermined magnitude.

2. In combination with a controllable cutting system as defined in claim 1 wherein the ply of sheet material is held against the cutting surface by vacuum hold down means including a vacuum sensor for sensing the level of vacuum applied to the ply height, said system further comprising said processor means coupled and responsive to said vacuum hold down means for decreasing said feed rate during the cutting process in response to a decrease in the level of vacuum holding said ply of sheet material.

3. In combination with a controllable cutting system as defined in claim 1 wherein said system further comprises means for calibrating said cutting system wherein the current supplied to said motor means for moving said cutting means in an X, Y coordinate direction is determined for a "no-load" condition at each X, Y coordinate along the cutting surface, said "no-load" X, Y current values at each of said X, Y coordinates being stored for subsequent retrieval and use in calculating said single force vector representative of said actual cutting force developed by said cutting means.

4. In combination with a controllable cutting system as defined in claim 1 wherein said cutting means is automatically sharpened in accordance with a pre-known sharpening schedule, said system further comprising said processor means increasing said feed rate in response to said cutting means being sharpened during the cutting process.

5. Method for controlling a cutting system including motor means for moving a cutting means in an X, Y, C coordinate space across the cutting surface of said controllable cutting system using an expert system containing built-in application knowledge to cause the controllable cutting system to automatically seek an optimal feed rate to cut a ply height of various limp sheet material during a cutting operation in response to various of a number of possible system cutting parameters which parameters are changing during the cutting process, said method comprising:

the step of specifying and defining at least one path to be followed by said cutting means in cutting the ply height of limp sheet material;

the step of defining and specifying prior to a first cutting operation at least one preset configuration file defining specific cutting system control parameter data for directing the operation of the cutting system in an open loop control mode in accordance with said cutting system control parameter data, said preset configuration file defining a minimum feed rate and a maximum feed rate for cutting a ply height of specific predetermined limp sheet material, an X-commanded current magnitude and a Y-commanded current magnitude for energizing said motor means to move said cutting means in an X, Y coordinate direction across said cutting surface at a feed rate within said minimum and maximum feed rate defined in said preset configuration file;

the step of defining at least one motor current contour from said X-commanded current and said Y-commanded current magnitudes for operating said motor means at an expected predetermined velocity in said X, Y coordinate direction at each point along said at least one path;

the step of calculating from said X-commanded current magnitude and from said Y-commanded current magnitude a force expected at each point along said at least one path;

the step of energizing the motor means with a X-commanded current magnitude and Y-commanded current magnitude to move the cutting means with a predetermined feed rate defined in said preset configuration file;

the step of identifying the position of the cutting means along said at least one path;

the step of determining from the X-commanded current and the Y-commanded current supplied to said motor means a single force vector representative of the actual cutting force developed by said cutting means at said predetermined portion of said at least one path to determine the toughness of the "spread";

the step of comparing said actual cutting force to an expected cutting force at said predetermined portion of said at least one path to generate a force difference level magnitude, and the step of increasing the feed rate when the actual force is below the expected force, decreasing the feed rate when the actual force is above the expected force and stopping the controllable cutting system when the actual force exceeds the expected force by a predetermined magnitude.

6. Method for controlling a cutting system including motor means for moving a cutting means in an X, Y, C coordinate space across the cutting surface of said controllable cutting system using an expert system containing built-in application knowledge wherein the cutting system holds the ply of limp sheet material against the cutting surface by means of a vacuum hold down means, said method further comprising:

the step of sensing the level of vacuum applied to the ply height, and the step of decreasing the feed rate during the cutting process in response to a decrease in the level of vacuum holding the ply of sheet material.

7. Method for controlling a cutting system including motor means for moving a cutting means in an X, Y, C coordinate space across the cutting surface of said controllable cutting system using an expert system containing built-in application knowledge, said method further comprising:

the step of calibrating said cutting system wherein the current supplied to said motor means for moving said cutting means in an X, Y coordinate direction is determined for a "no-load" condition at each X, Y coordinate along the cutting surface, and the step of storing said "no-load" X, Y current values at each of said X, Y coordinates for subsequent retrieval and use in calculating said single force vector representative of said actual cutting force developed by said cutting means.

8. Method for controlling a cutting system including motor means for moving a cutting means in an X, Y, C coordinate space across the cutting surface of said controllable cutting system using an expert system containing built-in application knowledge wherein the cutting system further includes said cutting means being automatically sharpened in accordance with a pre-known sharpening schedule, said method further comprising:

the step of increasing said feed rate in response to said cutting means being sharpened during the cutting process.

* * * * *